United States Patent
Landau et al.

(10) Patent No.: US 7,302,403 B1
(45) Date of Patent: Nov. 27, 2007

(54) ORDER AND ACCOUNTING METHOD AND SYSTEM FOR SERVICES PROVIDED VIA AN INTERACTIVE COMMUNICATION NETWORK

(75) Inventors: Scott E. Landau, New York, NY (US); Peter D. Fante, Brooklyn, NY (US)

(73) Assignee: Osmio LLC, New York, NY (US)

( * ) Notice: Subject to any disclaimer, the term of this patent is extended or adjusted under 35 U.S.C. 154(b) by 764 days.

(21) Appl. No.: 09/595,528

(22) Filed: Jun. 16, 2000

(51) Int. Cl.
*G06Q 30/00* (2006.01)

(52) U.S. Cl. .................. 705/26; 705/34; 707/10; 709/218

(58) Field of Classification Search ................ 705/26, 705/27, 28, 30, 34; 707/10; 709/218
See application file for complete search history.

(56) References Cited

U.S. PATENT DOCUMENTS

| | | | | |
|---|---|---|---|---|
| 4,992,940 A * | 2/1991 | Dworkin | ...................... | 705/26 |
| 5,557,518 A * | 9/1996 | Rosen | ......................... | 705/69 |
| 5,590,197 A * | 12/1996 | Chen et al. | ................. | 705/65 |
| 5,687,323 A | 11/1997 | Hodroff | | |
| 5,758,327 A * | 5/1998 | Gardner et al. | ............... | 705/26 |
| 5,864,822 A | 1/1999 | Baker, III | | |
| 5,899,980 A * | 5/1999 | Wilf et al. | .................... | 705/26 |
| 5,913,202 A * | 6/1999 | Motoyama | .................... | 705/35 |
| 5,924,080 A | 7/1999 | Johnson | | |
| 5,940,807 A * | 8/1999 | Purcell | ......................... | 705/26 |
| 5,943,656 A | 8/1999 | Crooks et al. | | |
| 5,963,917 A | 10/1999 | Ogram | | |
| 5,963,925 A * | 10/1999 | Kolling et al. | ................ | 705/40 |
| 5,970,471 A * | 10/1999 | Hill | ............................. | 705/26 |
| 5,991,739 A | 11/1999 | Cupps | | |
| 6,044,362 A * | 3/2000 | Neely | .......................... | 704/34 |
| 6,062,674 A * | 5/2000 | Inui et al. | ..................... | 347/43 |
| 6,081,789 A * | 6/2000 | Purcell | ......................... | 705/37 |
| 6,092,053 A * | 7/2000 | Boesch et al. | ................ | 705/26 |
| 6,125,352 A * | 9/2000 | Franklin et al. | .............. | 706/26 |
| 6,173,272 B1 * | 1/2001 | Thomas et al. | ............... | 705/42 |
| 6,266,648 B1 | 7/2001 | Baker, III | | |
| 6,272,472 B1 * | 8/2001 | Danneels et al. | ............ | 705/27 |
| 6,324,522 B2 * | 11/2001 | Peterson et al. | ............. | 705/28 |
| 6,330,575 B1 * | 12/2001 | Moore et al. | ............... | 715/513 |
| 6,381,582 B1 * | 4/2002 | Walker et al. | ................ | 705/26 |
| 6,405,177 B1 * | 6/2002 | Dimattina | .................... | 705/26 |

(Continued)

OTHER PUBLICATIONS

Press Pass, "New Yorkers Now Able to Order Food Online From Over 100 Local Restaurants", New York, Dec. 15, 1997 two pages.*

(Continued)

*Primary Examiner*—Andrew Joseph Rudy
(74) *Attorney, Agent, or Firm*—Lipsitz & McAllister, LLC

(57) ABSTRACT

The present invention relates to a method and system for providing e-commerce and accounting services to organizations and service providers for offerings ordered by the organization via an on-line interactive communication network. In particular, the present invention relates to a method and system whereby a third party intermediary can absorb certain payment, collection and billing functions on behalf of an organization and service providers which provide services to the organization. The term service provider as used herein refers to any entity or individual that provides a service, including the service of providing goods.

27 Claims, 5 Drawing Sheets

U.S. PATENT DOCUMENTS

| | | |
|---|---|---|
| 6,427,911 B1 | 8/2002 | Barnes et al. |
| 6,493,685 B1 | 12/2002 | Ensel et al. |
| 6,535,880 B1 * | 3/2003 | Musgrove et al. ............ 707/10 |
| 2002/0095357 A1 * | 7/2002 | Hunter et al. ................. 705/27 |

OTHER PUBLICATIONS www.NYdelivery.com, "webarchive.org" Apr. 12, 1997, one page.* www.NYdelivery.com, "webarchive.org" Searching Results for Jan. 1, 1996—Jun. 19, 2003, one page.*

Anonymous, "New Web Business Caters to Law Firms: Former Associates start foodservice company", New York Law Journal, Jan. 2001, 4 pages, from Seamless Web.*

Anonymous, "You Want Fries With That?", New York Post, Mar. 2001, 3 pages, from Seamless Web.*

Web page from pizzanet.net web site, printed on Mar. 14, 2000 (1 page).

Web pages from waitersonwheels.com web site, printed on Mar. 14, 2000 (3 pages).

Web pages from waiter.com web site, printed on Mar. 14, 2000 (3 pages).

Web pages from food.com web site, printed on Mar. 8, 2000 (3 pages).

* cited by examiner

ORDER AND ACCOUNTING METHOD AND SYSTEM FOR SERVICES PROVIDED VIA AN INTERACTIVE COMMUNICATION NETWORK

BACKGROUND OF THE INVENTION

The present invention relates to a method and system for providing e-commerce and accounting services to organizations and service providers for offerings ordered by the organization via an on-line interactive communication network. In particular, the present invention relates to a method and system whereby a third party intermediary can absorb certain payment, collection and billing functions on behalf of an organization and service providers which provide services to the organization. The term service provider as used herein refers to any entity or individual that provides a service, including the service of providing goods.

Although the invention is described in connection with an embodiment for providing payment, collection and billing functions on behalf of professional service firms (the organization), their employees and restaurants (the service provider), it will be apparent to those skilled in the art that this invention may be applied to a variety of organizations other than professional service firms, including an association of individuals, non-profit groups, clubs, schools, committees, government agencies, other business entities, and the like. Similarly, the present invention can be applied to service providers other than restaurants, including florists, gift shops, travel agents, transportation providers, hotels, entertainment providers, office supply providers, document services, grocery providers, beverage services, and the like.

Many employers pass through the cost of meals ordered by employees to the clients for whom those employees perform services. The process begins with the employee ordering the meal and ends with the employer billing the client, and is filled with time-consuming, costly and labor intensive administrative functions on the part of the employer, the employee and the restaurant.

For example, many companies that service clients (such as law firms, advertising agencies, accounting firms, investment banks, and the like) bill clients for meals ordered by employees. This process typically requires an employee to order food, either paying for it in cash or by credit card or charging it to a "house account." A house account allows employees to order food and the restaurant sends the employer a bill for all such food orders. The employee then provides documentation of the meals ordered to the employer. The employer, in turn, collects and organizes the relevant records and bills each client for the food ordered by its employees. Further, the employer must reimburse the employee (if the employee paid for the meal) or pay the restaurant (if the employer has a house account).

The infrastructure involved in the accounting and payment process is paper intensive and administratively burdensome for both the employer and employee, and typically includes steps such as:

The employer must review all of the employees' reports, verify and store documentation, and ensure that each client is properly and timely billed;

The employer must either reimburse the employees or pay the restaurants (depending on whether the employer has house accounts with restaurants), often making these payments several months before receiving payment from the clients;

The employees must save receipts and prepare detailed reports of meals ordered.

FIG. 1 is a flow chart which details an example of how food orders are currently processed and billed. An employee working through lunch or dinner will typically order in food for delivery from a restaurant. As shown in step 1 of FIG. 1, such an employee will physically search around the office for a menu. The employee will then typically contact the restaurant by telephone or facsimile and order a meal (step 2). The restaurant takes the order from the employee (step 3) and delivers the meal to the employee (step 4).

If the employer has a house account with the restaurant, the employee signs the bill and provides client information to the restaurant delivery person (step 5). The restaurant will then send the employer a bill for the meals ordered by its employees (step 6). If the employer does not have a house account, the employee will pay the restaurant directly for the food, whether by cash or by credit card (step 7). In this case, the employee will complete a reimbursement report with client account information and submit the report to the employer's accounting department (step 8).

In either case (whether house account or not) the employer's accounting department verifies the bill from the restaurant or the report from the employee (step 9). If the bill is verified, the employer pays the restaurant (step 10) and if the report is verified the employer reimburses the employee (step 11). The employer's accounting department will then enter the meal expense information onto the client's bill (step 12) and send the bill to the client (step 13).

Additionally, at many businesses, employees will be required to maintain a record of all meals ordered to enable the accounting department to verify the house account billing statements received from the restaurants.

The invention provides numerous improvements over the prior art and corresponding benefits for the organization member/employee. For example, many business professionals and other employees working in client service industries frequently work through lunch or late into the evening. Consequently, these employees order meals from a few menus stashed in their desk drawers or from a few restaurants with whom their employer has house accounts. Many employers also rely on outside vendors to provide food for business meetings and conferences. The process of ordering can be a time-consuming, error-laden and stressful experience. In contrast, the invention can provide the employees with the following benefits:

1. Eliminate the need for the employee to submit reimbursement reports.
2. Easy access to a comprehensive, up-to-date list of menus, organized by food type or special preferences (e.g., kosher, vegetarian, etc.) through a user friendly and state of the art web site;
3. Memory of previous restaurant and order selections for each employee;
4. Records of client information, persons eating the meal and other information necessary for proper billing of that meal;
5. Servicing of orders for individuals and groups;
6. Providing an estimated time of arrival of the food order to the employee; and
7. Real-time assistance from a Help Desk to resolve any problems related to an order.

The invention also provides numerous benefits for the organization/employer. For example, the intermediary acts as a central repository for all of the information an employer needs in order to bill clients for meals ordered by its employees. When an employee orders using the invention, he or she will enter all of the information needed for the employer to bill that meal to a client properly. The intermediary will compile this information and send it to the employer electronically as often as the employer desires. This is preferable to the employer being dependent on employees to submit reimbursement reports because employees often fail to submit these reports in a timely fashion. This makes the workflow unpredictable for the employer's accounting staff and results in untimely bills to employer's clients.

The invention provides a single convenient report which eliminates the need to enter hundreds of reimbursement forms into the employer's accounting system and to store the supporting documentation. The report will be collated in the manner most convenient to the particular employer, whether by client, by date, or by employee. As a further convenience, an employer can have the intermediary generate a single bill for all of its restaurant ordering activity, rather than have each employee pay the restaurant for each meal and then seek reimbursement from his or her employer.

This system will have many advantages for employers, including:
1. simplicity of paying only one bill for nearly all of the restaurant orders of its employees;
2. convenience of receiving a single electronically generated reliable and verifiable report with all of the information the employer needs to bill its clients for the meals ordered by its employees;
3. Ease the administrative burdens on an employer's employees and accounting department associated with preparing and processing reimbursement reports, and billing of clients for meals;
4. Achieve cost savings as fewer employees need to attend to the process of reimbursement for, and client billing of, meals;
5. Achieve time savings because employees no longer need to keep receipts or fill out forms for reimbursement, nor do accounting personnel have to spend time sorting through this information;
6. Improve accuracy in billing because there are fewer opportunities for human error;
7. Improve cash flow because employers will, electronically, receive client billing information frequently and regularly. This enables the employer to bill its clients more quickly and, therefore, receive payment more quickly for the money it has paid out for these meals on the client's behalf;
8. Monitoring Employee Satisfaction of the restaurants the employee is ordering from and removing restaurants from the web site that do not deliver in a timely fashion or otherwise do not meet predefined standards.

The invention provides numerous benefits for the restaurant as well. Because the intermediary maintains records of all transactions between the restaurant and the employees of a particular employer, the invention will streamline a restaurant's payment and collection efforts by enabling the restaurant to dispense with taking credit card orders from that employer's employees and, instead, allow the intermediary to provide a single bill to the employer on that restaurant's behalf. A restaurant listed on the database will have its full menu displayed to potential customers on the web site, and the menu can be updated electronically. Also, the intermediary can allow the restaurant to list daily specials with the service, as well as discount offerings. Among the benefits a restaurant can recognize by being listed in the database are:

Increased revenue and improved marketing generated by its menu being accessible to a larger number of potential customers;

Lower costs because, by letting the intermediary bill an employer on its behalf, this will lower the restaurant's operating overhead related to billing, collections and marketing;

Elimination of credit card fees that a restaurant pays (typically, between 2% and 3%, plus a processing fee), because the intermediary is sending the restaurants' bills to the employers, the employers are reimbursing the intermediary and the intermediary is wiring the monies or sending a check to the restaurants.

In addition to the aforementioned benefits, the service will be appealing because it can (but does not have to) be implemented as a free service to the employer and employee, with a set percentage (e.g., 6%) of the dollar total of each order being billed to the restaurant. The cost to the restaurant is at least partially offset by the fact that the restaurant will not pay a credit card transaction fee for the vast majority of orders placed using the invention. Also, there is no cost to the restaurant to participate in the service as the restaurant only pays if it is actually making money through the service.

The present invention provides these and other advantages over the current methods of ordering, billing, and paying for meals delivered to employees, as well as convenience, time savings, and cost savings to employers, employees, and restaurants.

Methods and systems providing the above and other advantages are provided.

SUMMARY OF THE INVENTION

The present invention relates to a method and system for providing e-commerce and accounting services to organizations and service providers for offerings ordered by the organization via an on-line interactive communication network. In particular, the present invention relates to a method and system whereby a third party intermediary can absorb certain payment, collection and billing functions on behalf of an organization and service providers which provide services to the organization. The term service provider as used herein refers to any entity or individual that provides a service, including the service of providing goods.

In an illustrated embodiment, the present invention provides a method and system for providing payment, collection and billing functions on behalf of professional service firms (the organization), their employees and restaurants (the service provider) used by their employees through the use of a searchable database accessible via an on-line interactive communication network. The term restaurant is used in a generic sense and includes any food or beverage provider.

As will be evident from the following description, the present invention is applicable in any situation where an organization purchases a service (which can be the provision of goods) from a service provider and the organization then passes the cost of the service on to another party, such as a client.

In a particular embodiment of the invention, an intermediary provides e-commerce and accounting services to organizations and service providers for offerings ordered by members of the organization and delivered by the service provider. The intermediary provides, maintains, and monitors a computerized searchable database of service providers with associated offerings. Members of an organization are allowed to individually access the database via an interactive communication network (e.g., a global communication network such as the Internet and the like). The members are able to select a service provider from the database and to select offerings from the selected service provider. The members communicate billing information to the intermediary which billing information is stored at the intermediary. The offerings selected by the members are communicated from the intermediary to the selected service provider. The intermediary then provides a consolidated invoice to the organization for all offerings ordered by the members during a predetermined time period.

In a further embodiment of the invention, the intermediary collects payment from the organization on the consolidated invoice. The intermediary then pays the service provider for all offerings ordered by the members during the predetermined time period.

The members may be provided with an additional option of paying for the offering via one of a credit card or cash, in which instance the offering is not billed to the organization on the consolidated invoice.

In a further embodiment of the invention, the organization is a business and the members are employees of the business. The billing information in this embodiment may include at least one of the employees' personal identification numbers, a specific identification number for said business, the business' address, the business' telephone number, and client billing codes.

In another embodiment of the invention, the searchable database is provided in the form of a searchable web site.

The web site may include at least one web page associated with each restaurant in the database, which web page displays at least one of the restaurant menu, the restaurant food type, and the restaurant specialties of the day.

In a further embodiment of the invention, the intermediary is capable of generating a report of all meals ordered by the employees during a specified time period containing at least one of order date, order time, employee name, employee's personal identification number, meal ordered, meal cost, client name, client code, and restaurant name. The report is forwarded from the intermediary to the business.

The report can be sorted by at least one of order date, order time, employee name, employee's personal identification number, meal ordered, meal cost, client name, client code, and restaurant name. In addition, the report can be generated upon demand by the organization.

In another embodiment of the invention, the report is forwarded from the intermediary to the organization via one of facsimile, email, a global communication network, or said interactive communication network.

In another embodiment of the invention, the intermediary is capable of generating a receipt containing at least one of an order confirmation number, employee name, the employee's personal identification number, meal ordered, order date, order time, meal cost, client name, client code, restaurant name.

The receipt can be forwarded from the intermediary to at least one of the employee, the restaurant, and the organization. The receipt may be forwarded from the intermediary via one of facsimile, email, a global communication network, or said interactive communication network.

In a further embodiment of the invention, the intermediary can forward to the employee an estimated time of meal delivery from the restaurant to the organization.

The database is searchable by at least one of restaurant name, food type, food preference, and restaurant location.

In another embodiment of the invention, the business maintains house accounts with the restaurants and the consolidated invoice provides consolidation of amounts due on the house accounts.

In a further embodiment of the invention, the intermediary retains a commission from the payment received from the organization, wherein only the balance of the payment from the organization minus the commission is forwarded by the intermediary to the service provider.

In another embodiment of the invention, the intermediary is capable of providing a history of previous orders for each member. The intermediary can also provide real-time assistance to the organization, the employee or the service provider to resolve problems associated with an order.

In a further embodiment of the invention the intermediary can provide a consolidated invoice to the organization via one of facsimile, email, a global communication network, or said interactive communication network. The consolidated invoice may contain only amounts due for offerings ordered from a particular service provider, such that multiple consolidated reports may be provided, each relating to a separate service provider. In the alternative, the consolidated invoice may contain amounts due to each service provider which has been ordered from during the predetermined time period.

In an alternate embodiment, the service providers may be providers of flowers, gifts, transportation, accommodations, travel arrangement, entertainment, office supplies, office copies, documents, food, or beverages.

In a further embodiment, the members are only allowed access to the searchable database for a pre-selected group of service providers. The pre-selected group of service providers may be determined based on geographic location of the organization. The geographic location can be determined by proximity to the organization.

In another embodiment of the invention, delivery of the offerings from the service provider to the members is provided for.

DETAILED DESCRIPTION OF THE INVENTION

Figure 1:
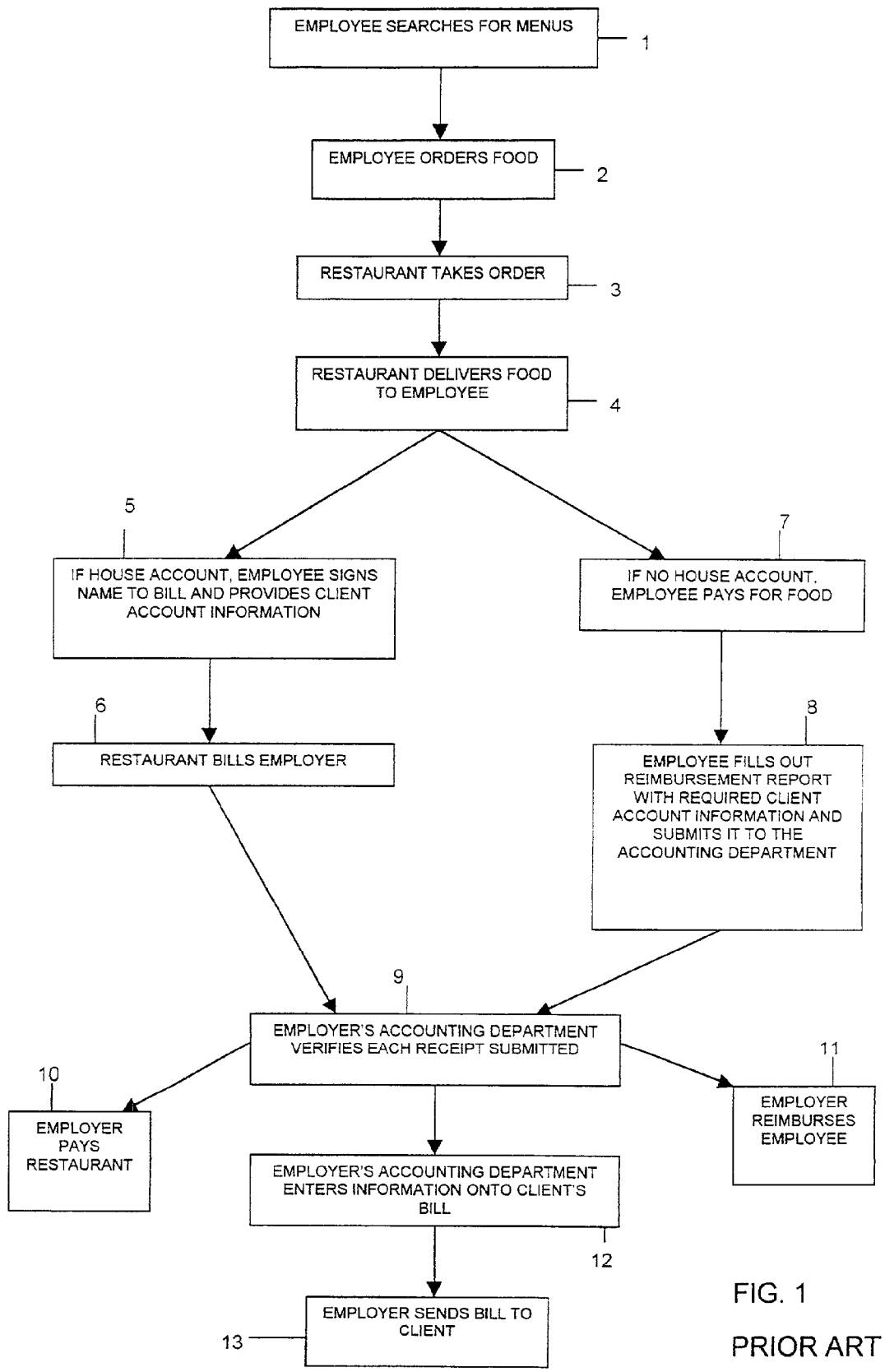
FIG. 1 is a flowchart illustrating the prior art method of processing and billing food orders.

The present invention relates to the provision of e-commerce and accounting services to organizations and service providers, for offerings ordered by the organization via an on-line interactive communication network. In particular, the present invention relates to a method and system whereby a third party intermediary can absorb certain payment, collection and billing functions on behalf of an organization and service providers used by the organization. The term "service provider" as used herein refers to any entity or individual that provides a service, including the service of providing goods.

In an illustrated embodiment provided for purposes of example, payment, collection and billing functions are provided on behalf of professional service firms (the organization) and their employees, and restaurants (the service provider). A searchable database accessible via an on-line interactive communication network is provided to enable employees to order meals that are subsequently billed to the employer. The term restaurant is used in a generic sense and includes any food or beverage provider.

Although the invention is tailored to the situation where an employee of a professional service firm (e.g., legal, advertising, accounting, consulting, investment banking, recruiting, public relations, and the like) orders meals from a restaurant, it will be apparent to those skilled in the art that this invention may be applied to a variety of organizations other than professional service firms, including an association of individuals, non-profit groups, clubs, schools, committees, government agencies, other business entities, and the like. Similarly, the present invention can be applied to service providers other than restaurants, including, florists, gift shops, travel agents, transportation providers, hotels, entertainment providers, office supply providers, grocery providers, and the like.

As will be evident from the following description, the present invention is applicable in any situation where an organization purchases a service (which can be the provision of goods) from a service provider and the organization then passes the cost of the service on to another party, such as a client.

Before referring to the Figures, a generalized example of a particular embodiment of the invention is provided to show how the invention works:

The employee orders food on the intermediary's easy to use web site. The employee will provide an employee and employer specific identification number. The system will automatically retrieve all the related data according to the specific employee and employer identification number entered (i.e., delivery address).

The employee will enter the address and pick a time for the delivery. The employee can get food delivered now or later, and the system will only show restaurants that deliver at the time specified by the employee and that deliver to the employee's specified location.

The employee will pick a type of food (e.g., Italian, Chinese, etc.): The system will show the employee the restaurants from which he or she most recently ordered, and will also allow the employee to choose a type of food. When a type of food is selected, combined with the employee's selected delivery time and specified address, the system will only show the employee menus satisfying all of the criteria provided by the employee. The employee prints out a receipt with all of the pertinent information, including his or her order, a confirmation number, contact information of a Help Desk, and the like.

The employee will pick a restaurant. The employee can browse menus, see daily specials and coupons offered by each restaurant, etc. When the employee picks a menu, he or she will select menu items which will be remembered by the system. The employee will be able to select from multiple menus if there is more than one person ordering. Also, menus will be able to be printed so that people can review the menu and make selections.

The employee will enter billing information (if applicable). After selecting all of the food items, the employee will enter the necessary client billing information. For employees who are buying food which does not get billed to a client, the employees will provide their credit card information. The system will automatically remember the employee's credit card information for future orders (of course, the employee can use a different credit card).

The order is transmitted to the restaurant by e-mail or fax from the intermediary.

The restaurant sends an e-mail or facsimile to, or calls, the intermediary with the estimated time of the delivery, which the intermediary then conveys to the employee.

The restaurant delivers the meal.

The employee can call or e-mail the Help Desk to resolve any problems with the order.

The intermediary electronically sends to the employer all of the information needed by the employer to bill its clients for meals ordered by its employees. The information is collated as requested by the employer (i.e., by date, client or employee), and sent as frequently as the employer needs the information. Thus, the employer can control the workflow to update its clients' bills.

The intermediary sends the employer a bill for all of the meals ordered by its employees. The employer will make a single payment to the intermediary (as opposed to making hundreds of reimbursements to its employees and paying numerous restaurants). In the event that an employee ordered using the intermediary's service and paid by credit card, the employer can reimburse the employee using the information provided by the intermediary rather than burdening the employee with the administrative obligation of preparing and submitting a reimbursement request which also must be processed and verified by the employer's accounting department.

The intermediary pays the restaurants upon receipt of payment by the employers, net of a percentage commission (therefore, avoiding the burden of collecting the commission from the restaurants). This eliminates the need of the restaurant to send bills and collect for its house accounts, as well as eliminating the fees associated with accepting credit card orders.

The intermediary will provide a cutting-edge, user friendly and comprehensive web site.

Figure 2:
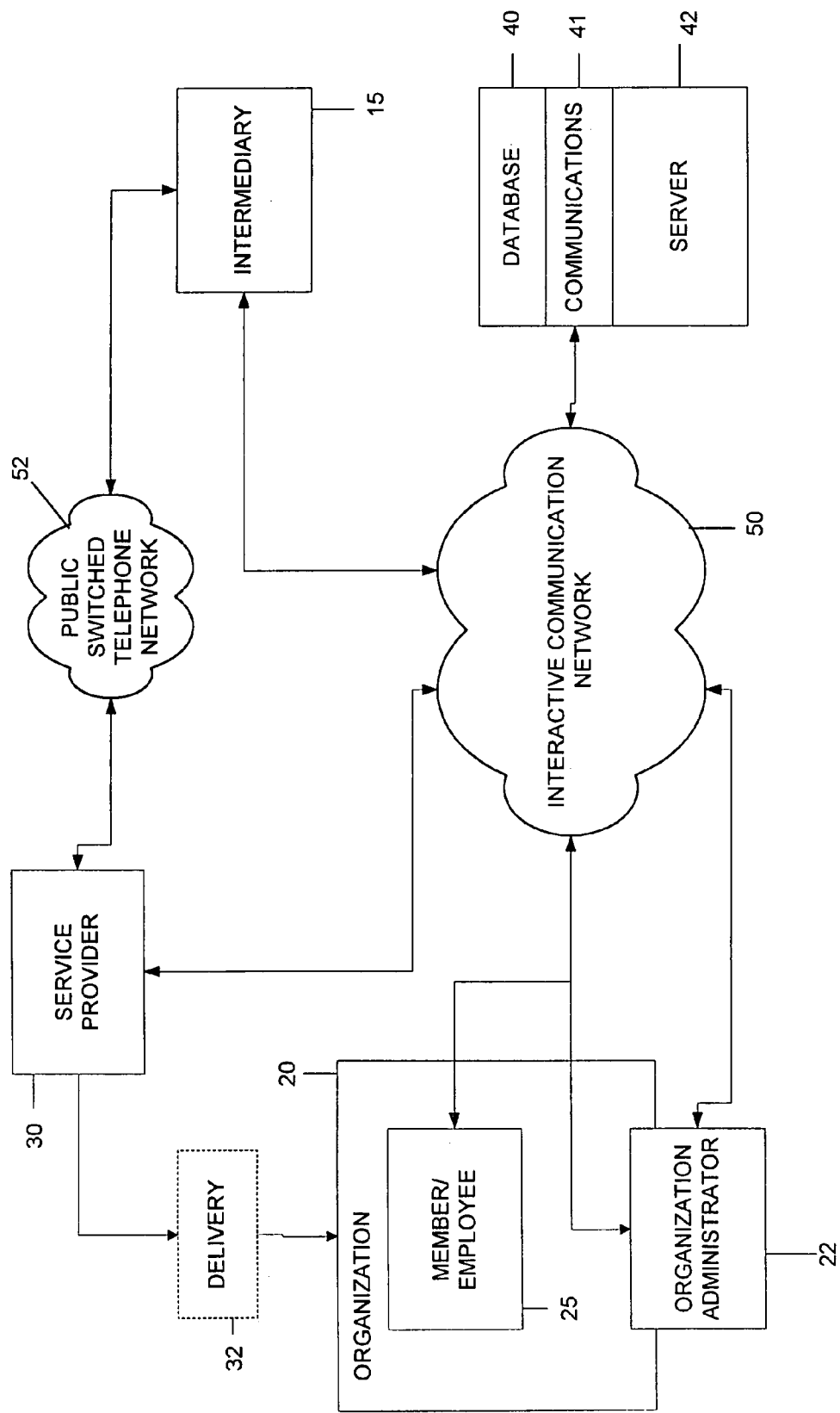
FIG. 2 is a block diagram of a first embodiment of the present invention.

In a particular embodiment as shown in FIG. 2, an intermediary 15 provides e-commerce and accounting services to organizations 20 and service providers 30 for offerings ordered by members 25 of the organization 20 and delivered by the service provider 30. The intermediary 15 provides, maintains, and monitors a computerized searchable database 40 of service providers 30 with associated offerings. Members 25 of an organization 20 are allowed to individually access the database 40 via an interactive communication network 50 (e.g., a global communication network such as the Internet and the like). The database 40 is in communication with the interactive communication network via communications software 41 and server 42. The members 25 are able to select a service provider 30 from the database 40 and to select offerings from the selected service provider 30. The members 25 communicate billing information (e.g., a client account number, organization account number, and/or employee number) to the intermediary 15, which billing information is stored at the intermediary 15. Although the members 25 are shown in FIG. 2 as being physically located at the office of the organization 20, the members may also access the database 40 from other locations (e.g., off site meeting or at home).

The offerings selected by the members 25 are communicated from the intermediary 15 to the selected service provider 30 (e.g., via the interactive communication network 50, via telephone or facsimile over a public switched telephone network 52, or via any other communication scheme now or hereafter available). The intermediary 15 then provides a consolidated invoice to the organization 20 (e.g., via an organization administrator 22) for all offerings ordered by the members 25 during a predetermined time period, such as weekly, monthly, quarterly, etc.

The interactive communication network 50 may be a global communications network such as the Internet, a localized or regional communications network, or the like.

In a further embodiment of the invention, the intermediary 15 collects payment from the organization 20 on the consolidated invoice. The intermediary 15 then pays the different service providers 30 for all offerings ordered from the respective service providers by the members 25 during the predetermined time period.

Figure 3:
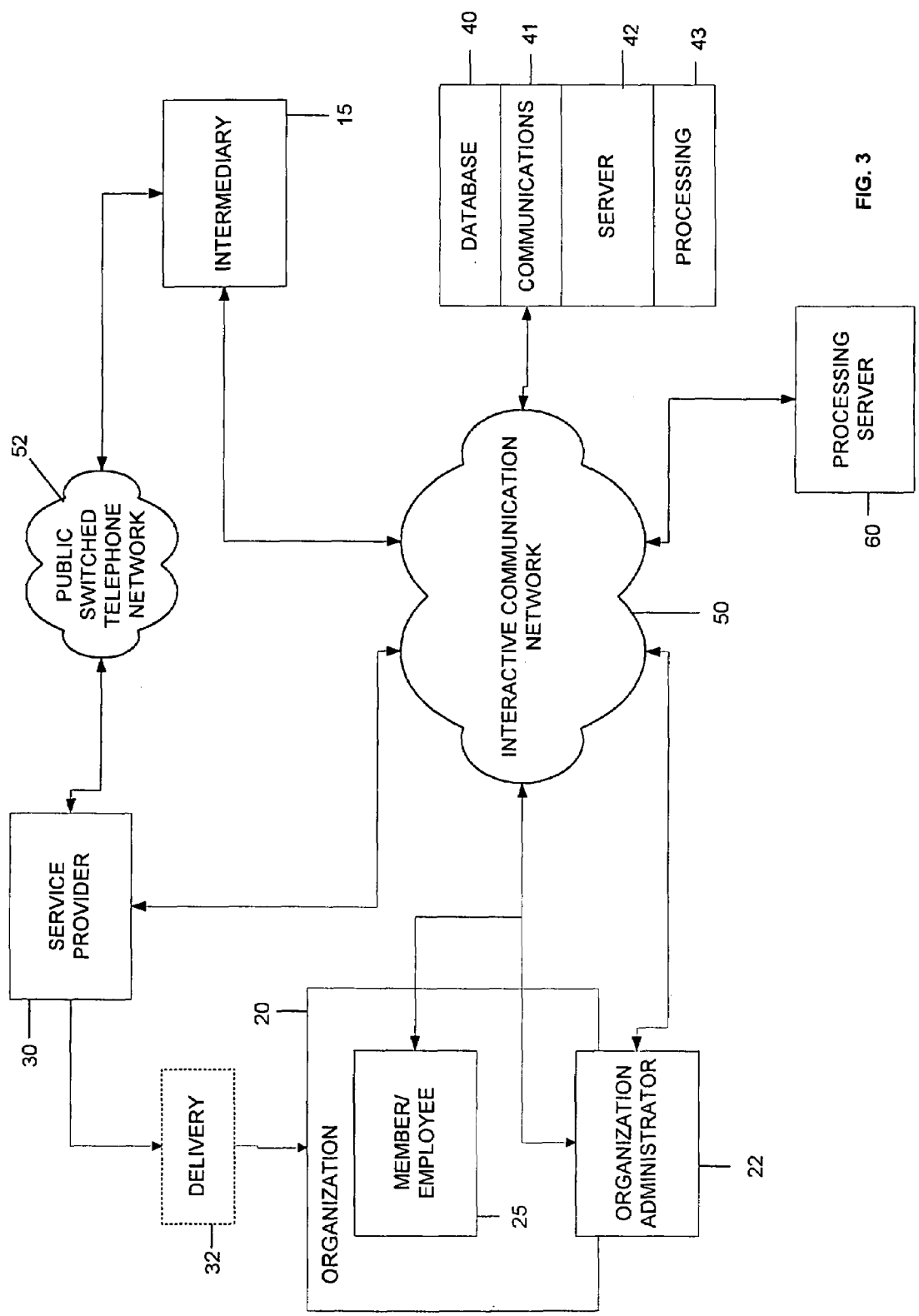
FIG. 3 is a block diagram of a second embodiment of the invention.

The members 25 may be provided with an additional option of paying for the offering via one of a credit card or cash, in which instance the offering is not billed to the organization on the consolidated invoice. As shown in FIG. 3, when the employee 25 uses a credit card to pay for the meal, additional processing software 43 associated with the intermediary 15 is required in order to enable processing of the credit card transaction and communication with a processing server 60 of the credit card company (or a third party on behalf of the credit card company).

In a further embodiment of the invention, the organization 20 is a business and the members 25 are employees of the business. The billing information in this embodiment may include at least one of the employees' personal identification numbers, a specific identification number for said business, the business' address, the business' telephone number, and client billing codes.

In another embodiment of the invention, the searchable database 40 is provided in the form of a searchable web site. The web site may include at least one web page associated with each restaurant in the database, which web page displays at least one of the restaurant menu, the restaurant food type, and the restaurant specialties of the day.

In a further embodiment of the invention, the intermediary 15 is capable of generating a report of all meals ordered by the employees 25 during a specified time period containing at least one of order date, order time, employee name, employee's personal identification number, meal ordered, meal cost, client name, client code, and restaurant name. The report is forwarded from the intermediary 15 to the business 20.

The report can be sorted by at least one of order date, order time, employee name, employee's personal identification number, meal ordered, meal cost, client name, client code, and restaurant name. In addition, the report can be generated upon demand by the organization 20.

In another embodiment of the invention, the report is forwarded from the intermediary 15 to the organization 20 via one of facsimile, email, a global communication network, or said interactive communication network 50. Of course, the report can also be forwarded via conventional mail or courier.

In another embodiment of the invention, the intermediary 15 is capable of generating a receipt containing at least one of an order confirmation number, employee name, the employee's personal identification number, meal ordered, order date, order time, meal cost, client name, client code, restaurant name.

The receipt can be forwarded from the intermediary 15 to at least one of the employee 25, the restaurant 30, and the organization 20. The receipt may be forwarded from the intermediary 15 via one of facsimile, email, a global communication network, or said interactive communication network 50. The receipt can also be forwarded via conventional mail or courier.

Various advantageous features of the present invention are now described. For example, the intermediary 15 can forward to the employee 25 an estimated time of meal delivery from the restaurant 30 to the organization 20.

To assist an employee in choosing and obtaining food, the database 40 is searchable by at least one of restaurant name, food type, food preference, and restaurant location.

The invention is particularly suitable to situations where the business 20 maintains house accounts with the restaurants 30. In such a situation, the consolidated invoice provides consolidation of amounts due on the house accounts.

Obviously, the intermediary will want to be compensated for the services provided. In a preferred embodiment, the intermediary 15 retains a commission from the payment received from the organization 20, wherein only the balance of the payment from the organization 20 minus the commission is forwarded by the intermediary 15 to the service provider 30.

The intermediary 15 is also provided with the capability of providing a history of previous orders for each member 25. Moreover, the intermediary 15 can provide real-time assistance to the organization 20, the employee 25 or the service provider 30 to resolve problems associated with an order.

The intermediary 15 can provide a consolidated invoice to the organization 20 via one of facsimile, email, a global communication network, or said interactive communication network 50. The invoice can also be forwarded via conventional mail or courier. The consolidated invoice may contain only amounts due for offerings ordered from a particular service provider 30, such that multiple consolidated reports may be provided, each relating to a separate service provider 30. In the alternative, the consolidated invoice may contain amounts due to each service provider 30 which has been ordered from during the predetermined time period.

Although the above examples relate to the provision of food delivery services, the service providers 30 may alternatively be providers of flowers, gifts, transportation, accommodations, travel arrangement, entertainment, office supplies, office copies, documents, or any other commodity.

In a further embodiment, the members 25 are only allowed access to the searchable database 40 for a pre-selected group of service providers 30. The pre-selected group of service providers 30 may be determined, for example, based on geographic location of the organization 20. The geographic location can be determined by proximity to the organization 20. The pre-selected group can be determined based on other factors as well, such as price points.

Once an order is placed and accepted, the service provider 30 provides for delivery 32 of the offerings to the members 25.

Figure 4:
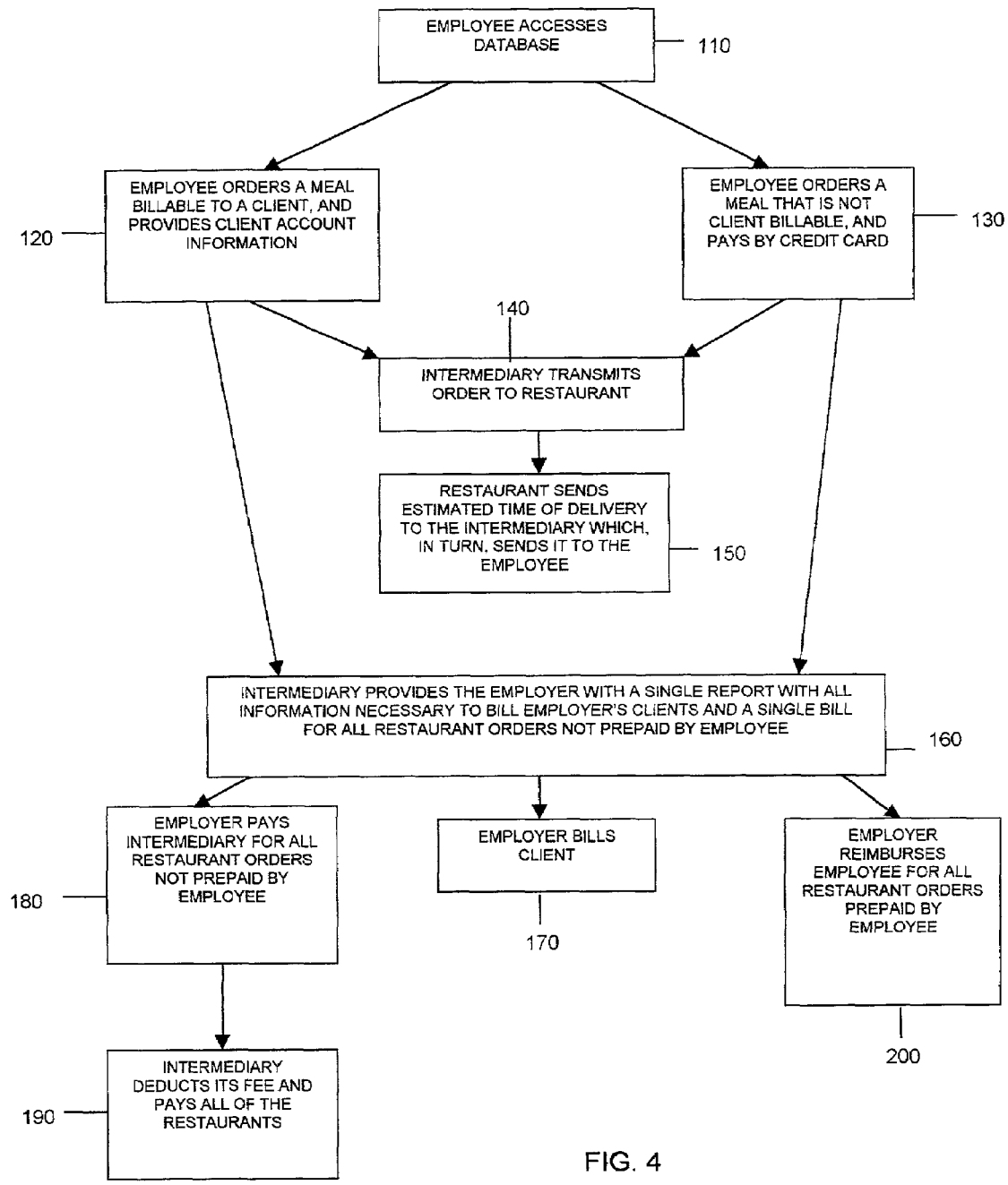
FIG. 4 is a flowchart illustrating the process of ordering and accounting for food orders in accordance with the invention.

FIG. 4 is a flowchart illustrating one possible implementation of the present invention. The member/employee accesses the database (Step 110). The employee then selects a restaurant and orders a meal billable to the client, in which case client account information is provided (Step 120).

In the alternative, the employee can order a meal which is not client billable, in which case the employee provides credit card information (e.g., personal credit card or corporate credit card) (Step 130). In either case, the intermediary transmits the order to the selected restaurant (Step 140) and the restaurant may provide an estimated time of delivery to the intermediary (Step 150). The intermediary then provides the organization/employer with a single consolidated invoice for all the restaurant orders which contains sufficient information to enable the organization to bill the organization's clients for all orders not prepaid by the employees (Step 160). The employer can then bill the clients (Step 170). The employer pays the intermediary for all the orders which were not prepaid by the employees (Step 180). The intermediary then deducts its fee and pays the restaurants (Step 190). The employer may reimburse the employees for orders prepaid by the employee (Step 200).

Figure 5:
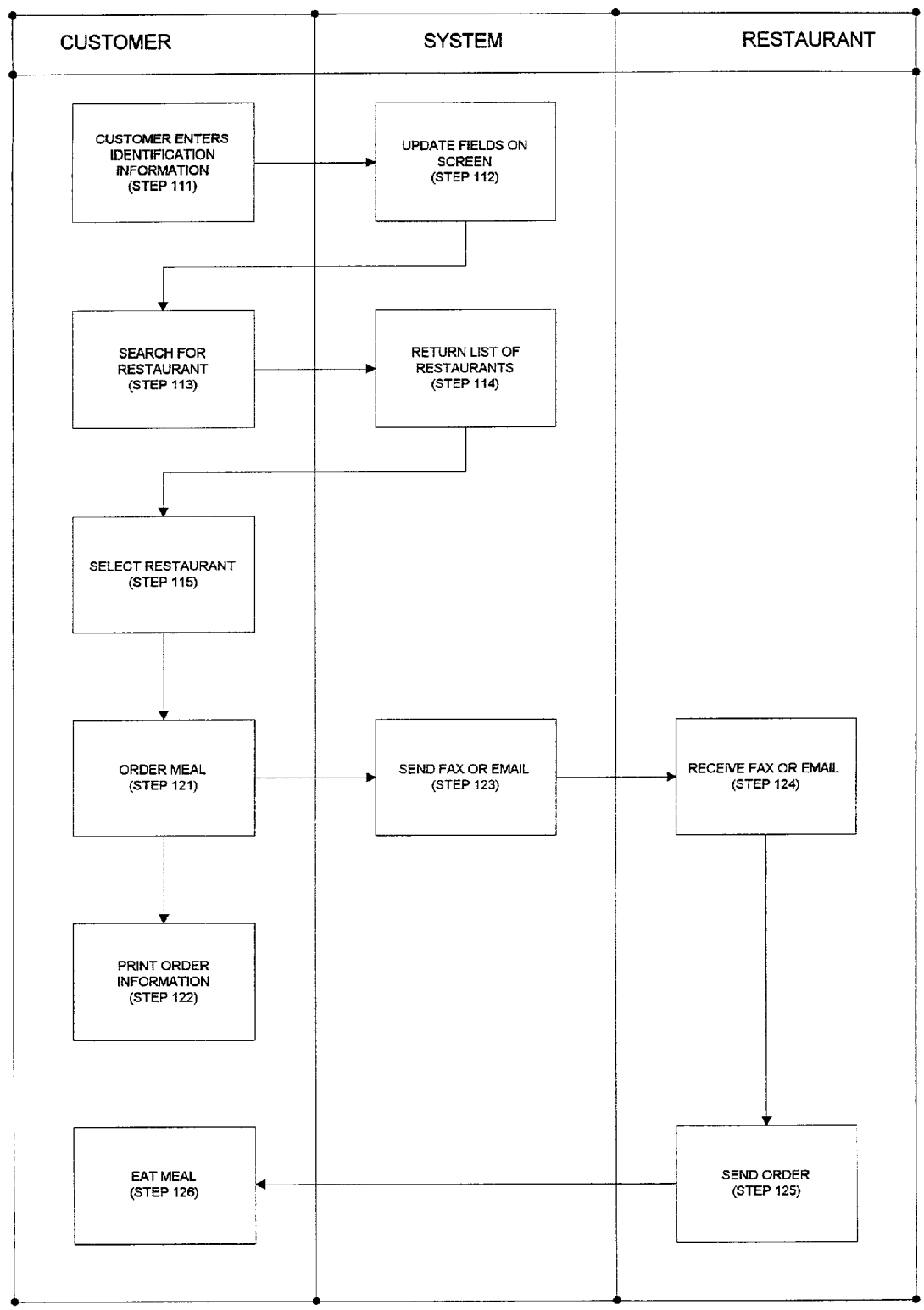
FIG. 5 is a process diagram illustrating the interaction between and functions of each of the customer, system of the invention, and service provider.

FIG. 5 is a detailed flowchart of an example of the ordering process of present invention (Steps 110 through 140 of FIG. 4). The inputs and functions of each of the customer, the system, and the restaurant are broken down in the Figure. Initially, the employee accesses the database and enters his or her identification information (Step 111). The system then automatically retrieves all the related data according to the employee identification (e.g., organization name, delivery address, list of clients to select from, order history, etc.) (Step 112). The retrieved information is displayed on the employee's screen for verification and possible editing. The employee can search the database for a restaurant according to parameters such as: name of restaurant, Chinese, kosher, vegetarian, health conscious, etc. (Step 113). The system returns a list of restaurants based on the search criteria and which restaurants deliver to the employee's address (Step 114). The employee scrolls through the list of restaurants and selects the one from which he or she wishes to order (Step 115). The employee views the menu of the selected restaurant and selects the item he or she wishes to order (Step 121). The employee is able to print this screen for his or her records (Step 122). The system automatically sends the order, such as by fax, e-mail, or other communication to the restaurant with the order information (Step 123). The restaurant receives and processes the order and may send an e-mail, fax, or other communication to the system of the estimated time of delivery (Step 124). The restaurant delivers the meal (Step 125). The employee eats the meal (Step 126).

As discussed above, the invention may be presented as a web site accessible by the members of the organization. An example of a particular web site implementation which may be provided by the intermediary is as follows:

Screen One
  Web site logo and link to contact intermediary are provided.
  Employee enters employer's specific identification number and an employee specific identification number. [The system will automatically know the employers' addresses. If the delivery address is different, the employee will be able to insert a different address.]
  If the employee is billing this order to a client, then the employee will enter the necessary client billing information. If the employee is paying for this order with his or her own credit card, he or she will enter all of the necessary credit card information.
  Allow employee to select a type of food (e.g., Chinese, Italian, kosher, vegetarian, healthy, etc.) or enter the specific name of a restaurant.
  Provide pull-down menu to allow employee to select from the five most recent restaurants he or she ordered from.
  The system will automatically assume that the order is to be delivered as soon as possible unless otherwise indicated.
  On the bottom of the screen there may be one or two restaurants that can advertise their specials (for an additional charge payable to the intermediary).

Screen Two
  Employee will see only those restaurants that fit the parameters determined by the employee.
  Next to the name of each restaurant, there will be a description of the type of restaurant (e.g., Chinese, Italian, kosher, etc.).
  Employee will scroll through the available restaurants and select the restaurant from which he or she wishes to order.

Screen Three
  Employee will view the menu of the selected restaurant and select each item he or she wishes to order. The items on the menu can be broken down into various categories, such as appetizers, salads, entrees, desserts, beverages, specials, and the like. The amount of the order will be automatically added up on the right side of the screen while the employee is ordering. The employer can supply the intermediary with a set percentage amount for a tip that the intermediary will apply to all orders by any employee, or, in the alternative the employee can type in the tip.
  The employee will be able to provide specific instructions for the order (e.g., no MSG, spicy, medium rare).

Screen Four
  This screen will give the employee a confirmation number, the employer and employee specific identification number, the client/matter number, the order, the phone number of intermediary's Help Desk to call or e-mail with any problems concerning the order and allow the employee to print out all of this information.
  Then employee will be given the opportunity to go back to Screen One and place another order at another restaurant with the same or different client/matter number. The first order will be saved by the intermediary.

It will be apparent to those skilled in the art that the implementation described above is only one way in which the method and system of the present invention can be set up. All alternatives are intended to be included within the scope of the invention.

It should now be appreciated that the present invention provides an improved method and system whereby a third party intermediary can absorb certain payment, collection and billing functions on behalf of an organization and service providers which provide services to the organization.

What is claimed is:

1. A method for providing electronic commerce and accounting services to organizations and service providers for offerings ordered by members of the organizations and delivered by the service providers, comprising the steps of:
  providing said members with online access to a searchable database of said service providers with associated offerings via an interactive communication network, said searchable database being maintained by an intermediary;
  enabling the members to electronically select a service provider from the database;
  enabling the members to electronically select offerings from the selected service provider via the database;
  enabling the members to electronically communicate the selected offerings and billing information for payment of the selected offerings to the intermediary;
  electronically storing the billing information at the intermediary;

electronically communicating the offerings selected by the members from the intermediary to the selected service provider; and providing a consolidated invoice from the intermediary to an organization for a plurality of offerings ordered by a plurality of members of that organization during a predetermined time period from a plurality of service providers.

2. A method in accordance with claim 1, comprising the further steps of:

collecting payment by the intermediary from the organization on the consolidated invoice;

paying of the service provider by the intermediary for all offerings ordered therefrom by the members during the predetermined time period.

3. A method in accordance with claim 1, wherein the members are provided with an additional option of paying for the offering via one of a credit card or cash, in which instance the offering is not billed to the organization on the consolidated invoice.

4. A method in accordance with claim 1, wherein:

the organization is a business;

the members are employees of the business; and the billing information includes at least one of the employees' personal identification numbers, a specific identification number for said business, the business' address, the business' telephone number, and client billing codes.

5. A method in accordance with claim 4, wherein the searchable database is provided in the form of a searchable web site.

6. A method in accordance with claim 5, wherein the service providers are restaurants, further comprising the step of:

providing at least one web page associated with each restaurant in the database, which web page displays at least one of the restaurant menu, the restaurant food type, and the restaurant specialties of the day.

7. A method in accordance with claim 6, further comprising the steps of:

generating a report by the intermediary of all meals ordered by the employees during a specified time period containing at least one of order date, order time, employee name, employee's personal identification number, meal ordered, meal cost, client name, client code, and restaurant name; and forwarding the report from the intermediary to the business.

8. A method in accordance with claim 7, wherein the report can be sorted by at least one of order date, order time, employee name, employee's personal identification number, meal ordered, meal cost, client name, client code, and restaurant name.

9. A method in accordance with claim 7, wherein the report can be generated upon demand by the organization.

10. A method in accordance with claim 7, wherein the report is forwarded from the intermediary to the organization via one of facsimile, email, a global communication network, or said interactive communication network.

11. A method in accordance with claim 6, further comprising the step of:

generating a receipt by the intermediary containing at least one of an order confirmation number, employee name, the employee's personal identification number, meal ordered, order date, order time, meal cost, client name, client code, restaurant name.

12. A method in accordance with claim 11, wherein the receipt is forwarded from the intermediary to at least one of the employee, the restaurant, and the organization.

13. A method in accordance with claim 11, wherein the receipt is forwarded from the intermediary via one of facsimile, email, a global communication network, or said interactive communication network.

14. A method in accordance with claim 6, further comprising the steps of:

forwarding from the intermediary to the employee an estimated time of meal delivery from the restaurant to the organization.

15. A method in accordance with claim 6, wherein the database is searchable by at least one of restaurant name, food type, food preference, and restaurant location.

16. A method in accordance with claim 6, wherein:

the business maintains house accounts with the restaurants; and the consolidated invoice provides consolidation of amounts due on the house accounts.

17. A method in accordance with claim 2, further comprising the step of:

retaining a commission by the intermediary from the payment received from the organization, wherein only the balance of the payment from the organization minus the commission is forwarded by the intermediary to the service provider.

18. A method in accordance with claim 1, further comprising the step of:

providing a history of previous orders by the intermediary for each member.

19. A method in accordance with claim 1, further comprising the step of:

providing real-time assistance by the intermediary to resolve problems associated with an order.

20. A method in accordance with claim 1, wherein the step of providing a consolidated invoice from the intermediary to the organization is accomplished via one of facsimile, email, a global communication network, or said interactive communication network.

21. A method for providing electronic commerce and accounting services to organizations and service providers for offerings ordered by members of the organizations and delivered by the service providers, comprising the steps of:

providing said members with online access to a searchable database of said service providers with associated offerings via an interactive communication network, said searchable database being maintained by an intermediary;

enabling the members to electronically select a service provider from the database;

enabling the members to electronically select offerings from the selected service provider via the database;

enabling the members to electronically communicate the selected offerings and billing information for payment of the selected offerings to the intermediary;

electronically storing the billing information at the intermediary;

electronically communicating the offerings selected by the members from the intermediary to the selected service provider; and providing a plurality of consolidated invoices from the intermediary to the organization, each of the consolidated invoices contains amounts due for a plurality of offerings ordered by a plurality of members from a particular service provider.

22. A method in accordance with claim 1, wherein the consolidated invoice contains amounts due to each service provider which has been ordered from during the predetermined time period.

23. A method in accordance with claim 1, wherein the service providers are providers of one of flowers, gifts, transportation, accommodations, travel arrangement, entertainment, office supplies, office copies, documents, food, or beverages.

24. A method in accordance with claim 1, wherein the members are only allowed access to the searchable database for a pre-selected group of service providers.

25. A method in accordance with claim 24, wherein the pre-selected group of service providers is determined based on geographic location of the organization.

26. A method in accordance with claim 25, wherein the geographic location is determined by proximity to the organization.

27. A method in accordance with claim 1, further comprising the step of providing for delivery of the offerings from the service provider to the members.

* * * * *